United States Patent [19]

Lang

[11] 4,304,316
[45] Dec. 8, 1981

[54] COMPARATOR FOR THE AUTOMATIC CONTROL SYSTEM OF AN AUTOMATIC STEERING INSTALLATION

[75] Inventor: Armin Lang, Schwaebisch Grmuend, Fed. Rep. of Germany

[73] Assignee: Zahnradfabrik Friedrichshafen, AG, Friedrichshafen, Fed. Rep. of Germany

[21] Appl. No.: 936,945

[22] Filed: Aug. 25, 1978

[30] Foreign Application Priority Data

Aug. 25, 1977 [DE] Fed. Rep. of Germany ....... 2738328

[51] Int. Cl.$^3$ ............................................. B62D 5/06
[52] U.S. Cl. .................................. 180/131; 56/10.2; 56/DIG. 15; 137/82; 180/134
[58] Field of Search ............... 180/131, 79, 79.1, 79.3, 180/167; 137/82; 56/10.2, DIG. 15

[56] References Cited

U.S. PATENT DOCUMENTS

| | | | |
|---|---|---|---|
| 3,381,771 | 5/1968 | Granger | 180/108 X |
| 3,946,825 | 3/1976 | Gail | 56/10.2 |
| 3,972,381 | 8/1976 | Gail | 180/79.1 |
| 3,991,618 | 11/1976 | Stampfer | 56/DIG. 15 |

*Primary Examiner*—John P. Silverstrim
*Attorney, Agent, or Firm*—Zalkind & Shuster

[57] ABSTRACT

For use in an agricultural machine which is automatically steered by sensing along a row of plants, a component of the automatic steering system, namely, a comparator system is disclosed herein which utilizes hydraulic signals from independent sensors and mechanically compares such signals with each other and with a mechanical feedback responsive to the degree of angularity of the steered wheels of the vehicle. The net result of the combination and construction of the comparator system is to provide automatic steering control for a small variation of steering of left and right steering courses, for example 2 to 5 degrees, wherein any large amount of deflection of the steering wheels that may be caused by the vehicle operator taking over the steering function will not affect the automatic operation of the comparator mechanism nor will the comparator mechanism have any response thereto. Further the hydraulic system of the comparator sensors which "feel" the presence of corn stalks or vines ahead of the vehicle is hydraulically isolated from the hydraulic circuitry of the comparator interior. The invention is susceptible for use for directrix guidance by a single row of plants, for example corn stalks, or by guidance between directrices, e.g., parallel rows of plants. Due to the fact that two sensors are utilized which function independently of each other should interruption of the directrix, for example, a row of corn stalks, occur due to a cross path, there would be no sudden sharp steering deflection and the vehicle would continue in straight steering.

10 Claims, 11 Drawing Figures

COMPARATOR FOR THE AUTOMATIC CONTROL SYSTEM OF AN AUTOMATIC STEERING INSTALLATION

STATUS OF THE PRIOR ART

The present application is related to my prior copending application, Ser. No. 931,092, filed Aug. 4, 1978, now allowed, the disclosure of which is incorporated herein by reference.

In a special issue, No. 17 (1973) of Landbauforschung Voelkenrode-Wissenschaftliche Mitteilungen der Forschungsanstalt fuer Landwirtschaft (Agricultural Research Voelkenrode—Scientific Information of the Research Institute for Agriculture, pages 44 to 47, a control system for the steering of a vehicle has been described which depends on electro-hydraulic arrangement having a comparator that forms the difference of two quantities, namely, a deflection signal transmitted by a sensor being guided along a course to be followed and an auxiliary control effect produced by scanning from the steering of the vehicle. The differential quantity effected by the comparator is carried out purely electrically in the electrical part of the installation of the system.

In this same issue on pages 62 to 68, guide cable systems are discussed. In this case, wires carry AC current which serve as guidance beams and are scanned with coils located above and at both sides of the conducting wire. Simultaneous use of two conducting wires for steering control is described.

Also, it is already known in the art that a comparator of the fluid pressure type may be utilized, in which case a pressure fluid signal regulator is connected between the comparator and the fluid steering servomotor. The state of the art in this respect is indicated in my prior copending application, Ser. No. 931,092, filed Aug. 4, 1978, now U.S. Pat. No. 4,219,093, the disclosure of which is incorporated herein by reference.

THE PRESENT INVENTION

The present invention relates to a comparator for use in an automatic steering system of a vehicle wherein steering is guided by a directrix or directrices where the comparator produces a hydraulic signal effected by the difference between three quantities without any electrical circuit elements, wherein two of the quantities originate from sensors operating independently of each other and responsive to engagement with a directrix or a pair of directrices and wherein the third quantity is a feedback mechanically taken from the position of the steering lever of the vehicle which acts with the hydraulic signals effected by the sensors.

The invention is of particular importance for hydrostatic, automatic steering systems as used in vehicles and eliminates any need for a source of electric current by using a completely hydraulic arrangement. There is thus avoided the susceptibility to the difficulties occasioned by electric systems, especially susceptibility to trouble in electric switches.

The need for the invention is in particular related to agricultural vehicles wherein a guide path or directrix, for example, a row of corn stalks, is scanned from both sides by means of a sensor on each side of the row of stalks. Such sensors are independent of each other. However, the system likewise using two sensors between parallel rows of vines also uses the comparator of the present invention.

In particular where a pair of parallel directrices such as spaced rows of vines are used, and there may be an occasional interruption by a lack of plants or by a cross-path, a steering system equipped with only one sensor would cause a sharp steering deflection since when such sensor arrived at the gap it would give a false sensing that the vehicle was no longer traveling in a straight line. This would produce an unwanted sharp steering deflection. However, by the use of two sensors a gap along a path of one directrix would not cause a steering deflection; sensor signals would maintain a straight-ahead steering of the vehicle without any need for attention by the driver because the signals would be balanced out against each other.

Each sensor, having its own transmitter all as part of the comparator system connects with a comparator mechanism via hydraulic lines, and where it is necessary to disconnect lines to change the sensing apparatus to another vehicle, there is always the danger that in the course of reconnecting there will be an entry of air, dirt or other material into the automatic steering installation.

The invention herein provides a comparator which eliminates all electrical components by utilizing hydraulic control signals from the comparator through a regulator to a power steering system. The comparator per se compares or quantifies two hydraulic sensor signals and a steering lever mechanical feedback, and completely isolates the sensing hydraulic system from the steering control hydraulic system involving the interior of the comparator mechanism so that no air or impurities may get from one system into the other.

The separation of the hydraulic systems is achieved by providing a chamber for pressure fluid within the comparator along with a movable balance arm of a differential lever within such chamber. The chamber is hydraulically connected only with a steering control regulator while the balance arm or differential lever is acted upon only mechanically, namely, with the use of plungers or pistons. The two hydraulic lines coming from the transmitters of the sensors are therefore isolated from the chamber and connect only to bores in which are respective pistons operated by pressure of the signals in those two hydraulic lines. Such pistons act on the balance arm or differential lever which controls valving exposed within the pressure chamber and which valving effects signals to the regulator to be used in control of a servomotor for effecting vehicle steering. Thus the pressure chamber has no direct hydraulic action with the sensors or the sensor signal transmission lines which can be removed and used elsewhere without in any way opening up passages from which spurious matter can get into the pressure chamber and thus to the remainder of the overall control system.

While the two sensors effect hydraulic signals which control valving within the pressure chamber, mechanical feedback by means of a cam operated by the steering lever is provided to move the balance arm or differential lever proportionally to the degree the wheels have been steered which augments the actuating effect of the sensor signals on the balance arm or differential lever.

The invention is susceptible to great sensitivity of response to the feedback control proportional to the steered angle of the vehicle wheels for balance arm movements to either side of a central position for small distances of movement as occasioned by sensor signals.

Such sensitive middle range control by mechanical feedback will provide for proportional stroke of the servomotor at either end of the middle range of operation, that is, for either direction of steering where additional increase in sensor signal would not have any further steering effect. This is all achieved in a simple manner by way of mechanical feedback introduced through cam surfaces acting on a plunger engaging the balance arm.

The invention has the effect of steering the vehicle only to a limited extent in either direction from a straight-ahead steering condition and eliminates excessive steering as will be subsequently explained in connection with FIGS. 4-7. Since the directrices to be scanned or followed are, for the greatest part, straight, only minimal steering corrections of about 2 to 5 degrees are required.

A detailed description of the invention now follows in conjunction with the appended drawing in which.

DIRECTRICES, SENSOR AND CONTROL SYSTEM

Figure 1:
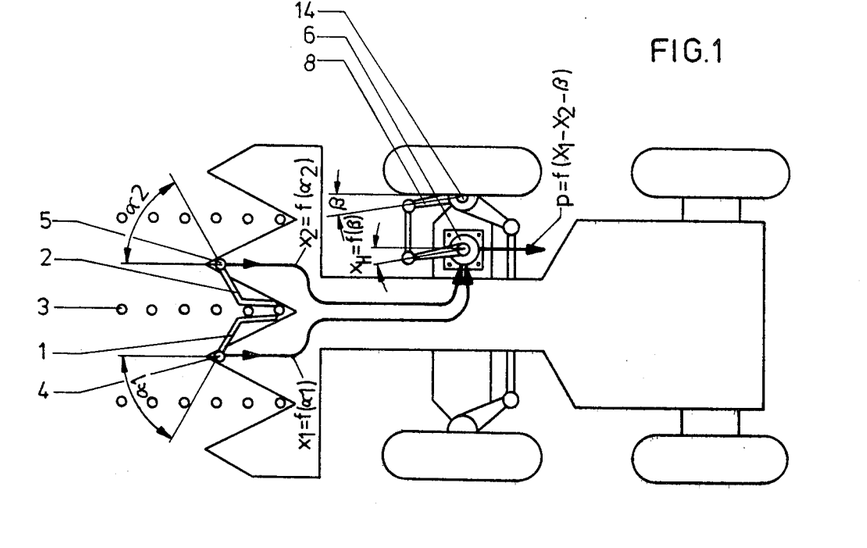
FIG. 1 is a symbolic diagram illustrating the arrangement of two sensors which scan a single directrix intermediate to sensors, for example, a row of corn stalks, on which diagram are illustrated, e.g., connections to the comparator and the connection to the vehicle steered wheels for mechanical feedback to the comparator.

Referring to FIG. 1, the directrix 3, for example a single row of corn stalks, is illustrated in relation to the moving vehicle which carries mechanical sensors 1 and 2 having pivotal scanning arms of any known type. The sensors are completely independent of each other and during scanning sensor 1 is deflected by an angle Alpha 1, and sensor 2 is deflected by an angle Alpha 2. Sensor 1 has a transmitter 4 to send a hydraulic output signal $X_1$ which is a function of Alpha 1, while sensor 2 has a transmitter 5 capable of transmitting the hydraulic output $X_2$ which is a function of Alpha 2.

Figure 3:
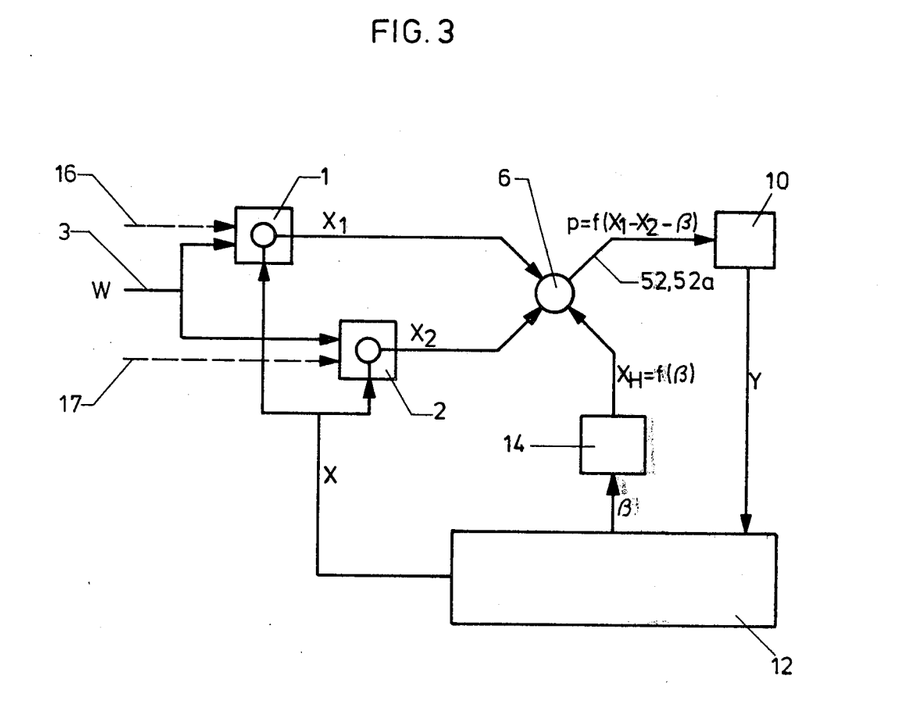
FIG. 3 is a block diagram showing the regulating system of an automatic steering system in which there is incorporated a comparator in accordance with this invention.

These sensor signals may be in the form either of a change in pressure of a hydraulic fluid, or in the form of a volume displacement of a liquid, the liquid being derived from the pressure source associated with the hydraulic steering system 12 as shown in FIG. 3. In any case the sensor signals are fed to a comparator 6 as indicated in FIG. 1 and which may have either a form shown in detail in FIGS. 4 to 7 or a form shown in detail in FIGS. 8 to 11.

A servomotor (not shown) which is part of an automatic steering installation actuates steering lever 8 rotating it in the course of steering to some angle, for example, angle Beta, FIG. 1. The steering lever 8 is transmitting mechanically to the comparator 6 an auxiliary regulating variable $x_H$ which is a function of the steering angle $\beta$. This transmission or feedback is carried out either by shaft 29 in FIGS. 4 and 5, or by shaft 96 in FIG. 8.

In the block diagram of the control or regulating system (FIG. 3) are again shown the two sensors 1 and 2, which are providing output signals $X_1$ and $X_2$. This is done by scanning the directrix 3. The two sensors are feeling the differences between the lateral distances X (of a portion of the vehicle with respect to the directrix 3) and the desired distances which are represented by the reference variable W. There desired distances can be chosen at will, which means that a certain point of the vehicle can have any chosen lateral distance from the directrix 3. The output signals $X_1$ and $X_2$ of the two sensors 1 and 2 are the actuating signals of the regulating system which are both fed to the comparator 6. Without a feedback device 14 the comparator 6 would form the difference of the signals $X_1$ and $X_2$ and feed a corresponding variable which is a function of this difference to a regulator 10 which can be of any known form as indicated in my prior copending application now U.S. Pat. No. 4,219,093; According to my aforesaid patent, FIG. 1 therein shows a comparator (8) to which steering angle signals are fed. The comparator feeds a differential signal to a regulator (12) having an amplifier action so as to feed an operating signal to a servomotor (14) of a fluid cylinder type that mechanically acts on a steering device (2). Thus, the output of the regulator is the correcting variable $\gamma$ which has the purpose of influencing the steering mechanism of the vehicle. In the present case it influences a steering valve in the servo motor control system controlling a servomotor for the steered wheels of the vehicle. In consequence the vehicle follows a curve to bring it closer to the desired distance from the directrix.

Without a feedback device 14 this procedure would take too much time, the vehicle would follow curves with insufficient steering relative the directrix. Therefore the feedback device 14 is practically a third sensor, namely for the steering angle $\beta$, which is obtained at the steering lever by the action of the servo-motor. A function of the angle $\beta$ is fed to the comparator 6 by the amount of rotation of either shaft 29 or 96 to increase the differential $X_1$-$X_2$.

The response according to the steering angle is obtained much more quickly than a response to sensors 1 and 2, and can only be obtained after the whole vehicle has changed its direction and its distance from the directrix. Therefore the whole regulating system has a quicker response.

Comparator 6 forms the difference from three input values, $X_1$, $X_2$ and $X_H$ and delivers to regulator control 10 an output value in the form of liquid pressure $p = f(X_1 - X_2 - X_H)$.

Figure 2:
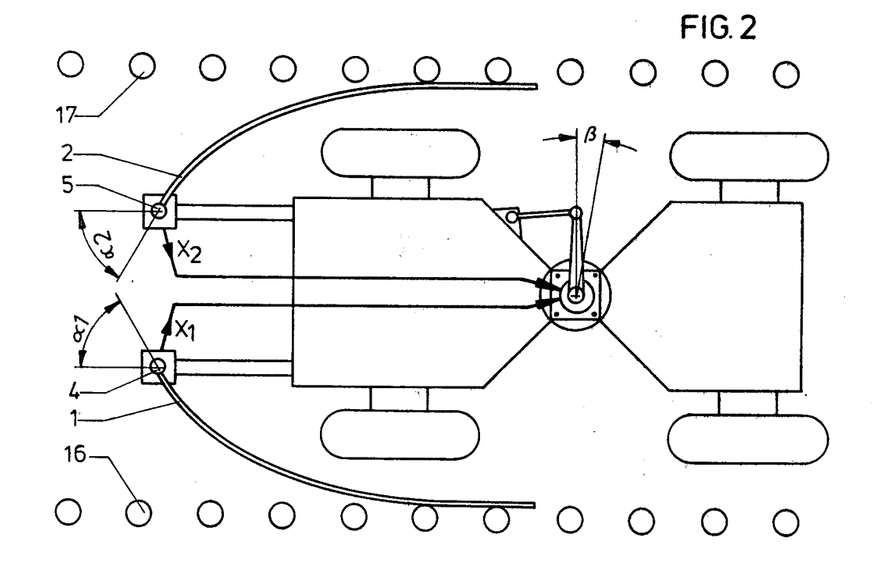
FIG. 2 illustrates symbolically an arrangement where sensors are used intermediate two rows of directrices, for example, vines.

FIG. 2 shows a vehicle in schematic form which travels between two directrices 16 and 17, representing, for example, rows of vines. In this case, the sensors 1 and 2 are moved inwardly by the directrices as compared with the single guide line 3 (FIG. 1). The reference variables derived from the directrices 16 and 17 are shown as dash lines on FIG. 3. The regulating system in which the sensors for the two directrices are incorporated, is the same as that explained above in accordance with FIGS. 1 and 3.

First Embodiment of the Invention

FIGS. 4 to 7 show the comparator 6 of FIG. 1 which receives actuating signals $X_1$ and $X_2$ as liquid pressures while the auxiliary controlled variable $X_H$ is fed in the form of a rotary movement of a shaft 29. The comparator comprises a housing 20 having a square base 22 surmounted by cylindrical housing body 24 within which is a chamber 25 sealed by a sleeve 26 and ring packing 27. Shaft 29 extends through sleeve 26 and into the base 22 mounted between ball bearings 28 and 28' and will be understood to be connected in any suitable manner with the position indicator 14 of FIG. 3.

Figures 4, 5:
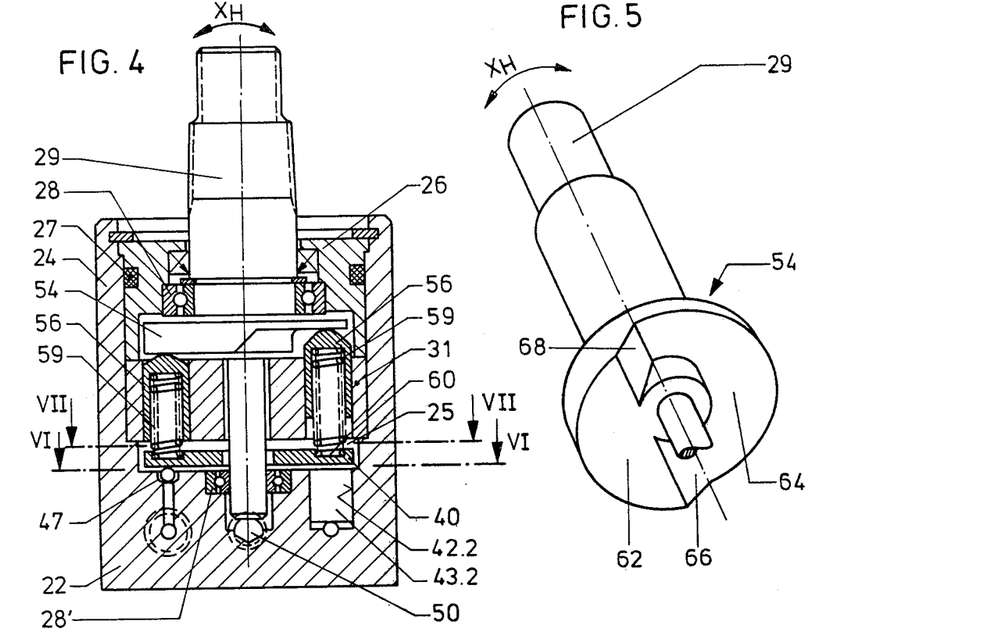
FIG. 4 is a vertical longitudinal cross section of the comparator taken on the line IV—IV of FIGS. 6 and 7, for a system responsive to oil pressure.
FIG. 5 is a perspective showing the comparator shaft and feedback cam.

Shaft 29 is rotatable by means of the steering lever 8 of FIG. 3, housing 20 being fixed to the frame of the vehicle near the steering lever. The housing contains a cylindrical block 31 and a pair of parallel posts 33 extend upward (FIGS. 6 and 7) fixedly from recesses 35 in base 22. The posts 33 at their upper ends may be secured in block 31 and are provided with pintle pins 37 which pivotally carry a balance arm 40. The balance arm 40 is, in this instance, essentially a circular plate which can rock clockwise or counterclockwise, as seen in FIG. 4, on the axis of the pintle pins which will be understood to intersect the axis of shaft 29 at right angles thereto going into the plane of the paper.

A pair of piston bores 42.1 and 42.2 are provided in base 22 extending to chamber 25 and having respective pistons 43.1 and 43.2 slidable therein. The pistons are pressure operated, by pressure signals from the transmitters 4 and 5 of sensors 1 and 2, respectively. Thus the bores communicate with passages 45.1 and 45.2 respectively (FIG. 6) which connect to the respective transmitters 4 and 5 for receiving the liquid pressure signals. The two pistons engage below balance arm 40 on opposite sides of pintle pins 37 to effect pivoting in the respective direction responsive to pressure changes. Base 22 also carries respective ball valves 47 and 47A wherein the valve heads in the form of balls are engaged by the lower surface of balance arm 40 on opposite sides of the axis of the pintle pins and it will therefore be seen that if the valves are normally open for straight ahead steering with the balance arm 40 level, either valve can be opened responsive to a direction of pivoting of balance arm 40 wherein the direction of pivoting is dependent upon the pressurizing of either piston 43.1 or piston 43.2.

In neutral, or straight steering both valves are equally open to a predetermined extent and the pressure signals nullify each other, $X_1-X_2=0$. Thus if piston 43.1 is pressurized the balance arm 40 will pivot counterclockwise as seen in FIG. 4 thereby depressing the ball valve 47A to open further a communication passage therethrough while valve 47 has its opening decreased. The valves connect with outlets 49 and 49A via passages 46 and 46A, all respectively, for connection to control lines 52 and 52A, respectively, which go to regulator control 10 (FIG. 3). Chamber 25 has a return oil passage 50 and is fed from an external pressure source as known in the prior art.

From the preceding it will be understood that the sensor oil system is isolated from chamber 25 insofar as any hydraulic connection is concerned and therefore from the remainder of the hydraulic system.

Figure 6:
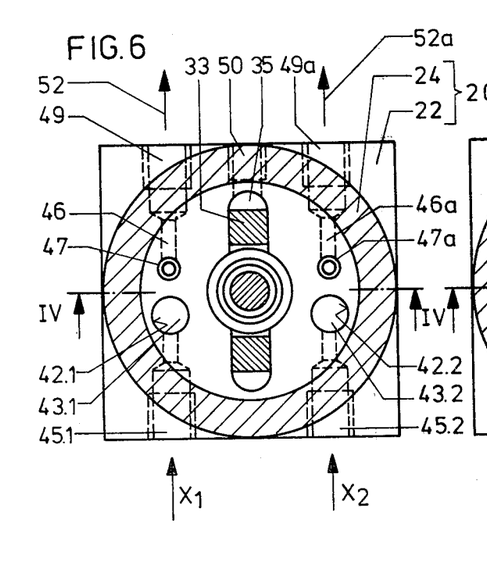
FIG. 6 is a horizontal cross sectional view on the line VI—VI of FIG. 4 as seen below the pivotal balance arm.
Figure 7:
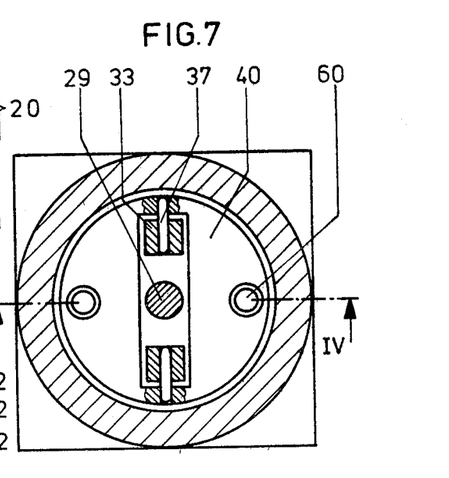
FIG. 7 is a horizontal cross section on the line VII—VII of FIG. 4 showing the pivotal balance arm.

It is important to note that the arrows shown in FIG. 6 for the lines 52 and 52A symbolize the direction of the signal flow to symbolic box 10, and are opposite to the actual direction of oil flow into chamber 25. In other words, the actual flow of oil would be from the regulator control 10 to comparator 6 through ports 49 and 49A.

In operation, pressure oil flows from regulator control 10 through the control connections or ports 49 and 49A, passages 46, 46A, respectively, and thence through valves 47 47A, as opened by a tilt balance arm 40 responsive to a respective sensor pressure signal, thence into chamber 25 and finally through passage 50 outwardly of the chamber. When balance arm 40 is thus pivoted, opening actuation of valve 47 or 47A effects pressure changes in the control lines 52 and 52A connecting with ports 49 and 49A to carry such changes to the inlets of the regulator control as symbolized by box 10.

The pressure difference existing between the lines 52 and 52A represents the difference in pressure represented by $X_1$ and $X_2$ as modified by the function of the steering angle Beta.

The regulator control 10 utilizes such pressure differential, depending on which may be the higher and lower in lines 52 and 52A to effect directional steering via the servomotor in vehicle system 12.

Shaft 29 effects mechanical feedback of the function of steering angle Beta and has a cam 54 rotative within the sleeve 26, which has cam surfaces that engage sleeves 56 that are slidable in parallel bores in the block 31. Each sleeve has a spring 59 therein to bias it against the cam surfaces and the lower end of the springs are socketed in recesses 60 of balance arm 40 maintaining it level (FIG. 4) for straight ahead steering wherein both valves 47 and 47A are equally open. Cam 54 has a raised section 62, a relatively recessed section 64 and a pair of transitional sections 66 in the form of flat, oblique surfaces, all as shown. In straight ahead steering, the sleeves 56 engage the inclined planes of the transitional sections 66 at a point such as 68. Upon mechanical feedback movement of the steering lever for a small deflection around a central position, a sleeve 56 is shifted slightly toward the recessed section 64 while the other sleeve is shifted slightly toward the raised section 62. Accordingly, the balance arm 40 is acted upon by the respective pressure springs 59 to receive a tilting force in a direction dependent upon the direction of rotation of shaft 29 by steering lever 8. The pressure differences occurring in the lines 52 and 52A thus represent the difference of the three input values, $X_1$, $X_2$ and the extent of steering angle Beta, $X_H$.

Where greater deflections of the steering angle occurs one of the sleeves 56 ultimately engages the recessed section 64 while the other engages the raised section 62. Both of these sections are in planes perpendicular to the axis of shaft 29 and accordingly no axial movement of sleeves 56 can occur in the event of additional rotation of shaft 29 and no additional forces are effected by springs 59 on balance arm 40.

Second Embodiment of the Comparator

Referring to FIGS. 8 through 11, the signal changes $X_1$ and $X_2$ are led to the comparator through ports at opposite sides of the housing (FIG. 10) and in the form of changes in volume flow. The feedback which compensates for changes brought about by the scanning arms is, however, again applied as a rotary movement actuating a cam 100 (FIGS. 9 and 11) and the control signals delivered by the comparator are represented as pressure changes in the lines 52 and 52A.

Figure 8:
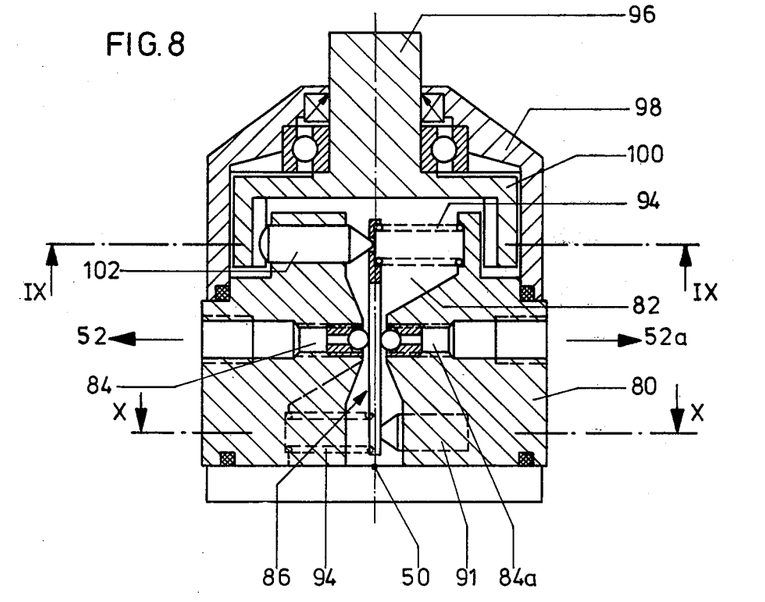
FIG. 8 is a vertical sectional view through a modification of the comparator wherein the system is responsive to oil volume.
Figure 9:
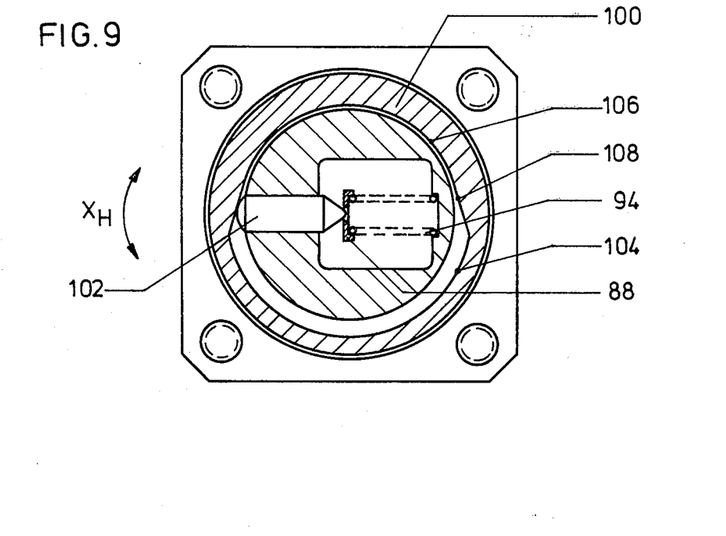
FIG. 9 is a section on the line IX—IX of FIG. 8.

The construction of the comparator comprises a housing 80 having a chamber 82 and ports for connection to lines 52 and 52A at opposite sides of the housing wherein ball valves 84 and 84A lead to chamber 82 from the ports, as shown in FIG. 8.

Figure 11:
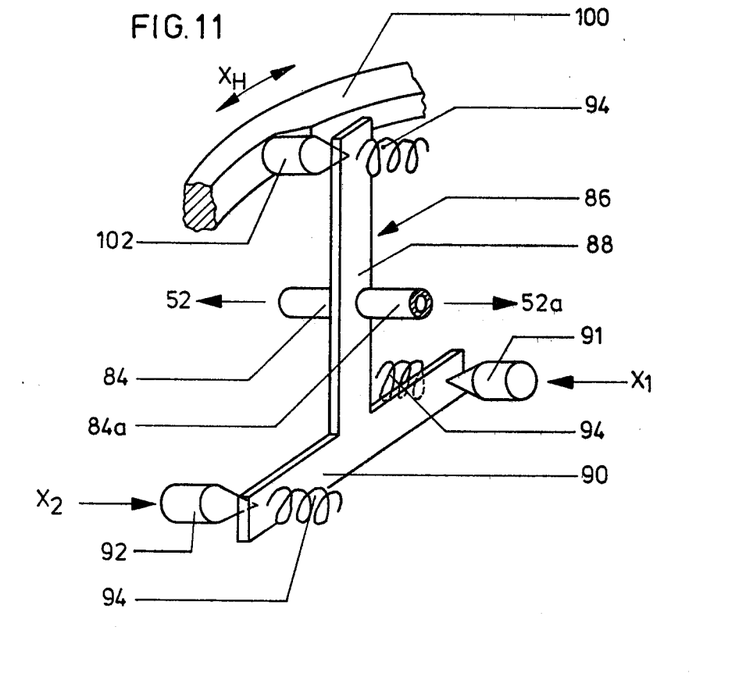
FIG. 11 is a perspective illustrating the differential lever of the system with certain components that coact therewith.

In chamber 82 there is a differential lever 86 in the form of an inverted T shaped plate wherein at about the center of the leg the balls of valves 84 and 84A engage (FIGS. 8 and 11). A pair of pistons 91 and 92 are disposed slidably in the housing acting against the ends of the cross bar 90 of the T (FIG. 11) and against respective springs such as 94 on opposite sides as shown. The pistons are connected to hydraulic lines leading to transmitters 4 and 5 in order to receive signals $X_1$ and $X_2$ operative through the pistons on the differential lever.

Figure 10:
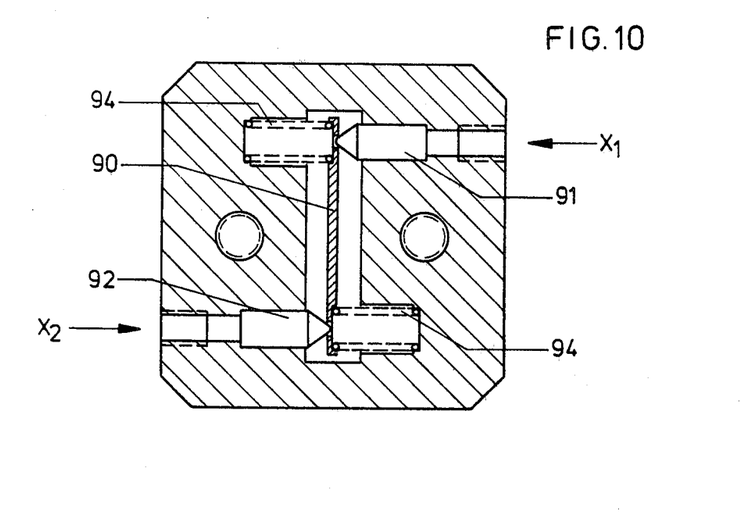
FIG. 10 is a section on the line X—X of FIG. 8.

As will be noted in FIGS. 8 and 10, all elements mentioned are carried in the housing 80 in the manner indicated in those figures.

A rotary shaft 96 will be understood to be coupled for mechanical feedback of a value $X_H$ corresponding to the angle of steering of the wheels, the shaft being carried in a cover 98 on housing 80. The shaft carries a skirt 100 having an inner wall with cam surfaces which act on a plunger 102 which plunger as seen in FIG. 11 acts on the extremity of the T leg of the differential lever 88, likewise against a respective spring 94.

The cam curvature comprises a circular surface 104 of a large radius, a circular surface 106 of a smaller radius, and transition cam surfaces 108. The function of the cam is to act on plunger 102 in basically the same function as that effected by cam 54 of FIG. 5 which acts on the pair of sleeves 56. In the present instance, also, a small rotation of shaft 96, as in the case of a small rotation of shaft 29 of FIG. 5, effects a camming action to produce a small feedback effect via surfaces 108. On the other hand, due to the circularity of surfaces 104 and 106 no actuation of plunger 102 will occur by engagement therewith in the event of maximal deflection of the servomotor operated steering lever.

Both embodiments of the comparator have two control lines 52 and 52A as a signal carrying to the regulator control 10 from which the signal Y is carried and transferred to the vehicle system 12. In each of the lines 52 and 52A pressures between zero and a maximum value may be transmitted. However, alternatively, it would be possible to get along with a single control line in situations where pressures fluctuated around a median value which is a few atmospheres above zero and provided a zero value is never reached nor dropped below.

In retrospect, it will be appreciated that various details not described specifically are clearly inferred from the description and the drawing, thus the valve means are of the ball check type biased toward opening by the respective springs on the opposite side of the movable elements in either modification, and the sleeves 56 of FIG. 4 engage the respective non-camming surfaces 62 and 64 which are axially spaced due to the slope of the intermediate transitional camming surfaces 66 and 68. Similarly, other structural features not specifically described, e.g., the conical point engagement of the pistons 91, 92 and 102 with apertures in T-plate 86 (FIGS. 9-11) will be apparent for stabilizing that element.

Further, as a matter of operation, it will be understood that due to the balancing of forces through springs in either modification of the invention, a signal $X_1$ or $X_2$ as hydraulically manifested responsive to a need for steering will accomplish such steering despite mechanical feedback to wheel straightening position effected by the cam of either modification. However, once a signal pressure $X_1$ or $X_2$ ceases to exist the force balancing element (40, 85) is moved back to neutral position via the compression stored in the cam operated spring or springs.

I claim:

1. An automatic steering system comprising sensors for providing hydraulic signals, a steering mechanism and a hydraulic comparator for receiving said hydraulic signals and sending signals to said steering mechanism, said comparator comprising hydraulic signal responsive means (43.1, 43.2; 92, 102) for each side of a course to be steered and operable by said respective hydraulic sensor signals; means (40, 86) actuatable by either of said hydraulic signal responsive means; a pair of normally open valve means (47, 47a; 84, 84a) reversibly operable by said actuatable means (40, 86) in response to actuation thereof to increase the opening of one valve means while simultaneously decreasing the opening of the other valve means whereby a hydraulic flow through said valve means is differentially controlled by operation thereof to effect resultant hydraulic signals to be sent to said steering mechanism; and steering angle feedback means (54, 100) operative on said actuatable means (40, 86) to increase the respective movements of said pair of valve means responsive to the degree of steering angle so as to increase the differential of hydraulic flow through said pair of valve means.

2. An automatic steering system having sensors for providing hydraulic signals and a hydraulic comparator to effect an increased differential between said hydraulic signals received from the sensors for steering control; said comparator comprising for each side of a course to be steered hydraulic signal responsive means (43.1, 43.2; 92, 102); means (40, 86) actuatable by either of said hydraulic signal responsive means; valve means (47, 47a; 84, 84a) for each side of said course to be steered and operable by said actuatable means (40, 86) in response to actuation thereof to increase the opening of one valve means while simultaneously decreasing the opening of the other valve means whereby a hydraulic flow through both of said valve means is differentially controlled by operation thereof to effect resultant hydraulic signals for steering control; and steering angle feedback means (54 etc., 100 etc.) operative on said actuatable means (40, 86) to increase the respective movements of said valve means as a function of steering angle so as to increase the differential of hydraulic flow through said valve means.

3. The system as set forth in claim 2, said actuatable means comprising a forced balancing element (40, 86) operable to actuate said valve means;

said feedback means comprising cam means (54, 56, 59; 100, 102, 94) operable on said force balancing element to increase the actuation thereof as a function steering angle.

4. The system as set forth in claim 3, said cam means comprising a cam (54, 100) having relatively short camming surfaces 66, 68; 108) and relatively long non-camming surfaces (62, 64; 104, 106) intermediate said relatively short camming surfaces;
wherein said relatively short camming surfaces increase the response of said force balancing element by actuation of said cam to a predetermined degree after which increased angle of steering has no effect on said force balancing element.

5. An automatic vehicle steering system comprising a comparator supplying directional steering signals and a steering mechanism receiving said steering signals and also supplying a feedback signal corresponding to a corrective steering action; said comparator comprising: a housing (20, 80) enclosing a fluid chamber (25, 82), a balance element (40, 86) within said chamber; force transmitting means (43.1, 43.2, 91, 92), mounted in said housing for exerting directional forces on said balance element corresponding to said directional steering signals; cam means (54 etc., 100 etc.) for exerting a feedback force on the balance element corresponding to the feedback signal; and valve means (47, 47a; 84, 84a) actuated by said balance element for controlling flow of fluid to the fluid chamber under variable steering conditions reflecting a differential function of the directional steering signals and the feedback signal.

6. The system as defined in claim 5 wherein said force transmitting means comprises a pair of piston elements engageable at spaced locations with the balance element, said housing being formed with a pair of bores (42.1 and 42.2) within which said piston elements are slidably mounted, said fluid chamber being hydraulically isolated from the bores by said piston elements.

7. The system as defined in claim 6 wherein said cam means includes a rotatable cam element (54, 100) having angularly spaced camming surfaces (66, 68, 108), cam follower means (56, 102) for transmitting said feedback force to the balance element, and spring means (59, 94) for yieldably holding the cam follower means in contact with the cam element and the balance element in contact with the piston elements.

8. The system as defined in claim 7 including means (37) pivotally mounting the balance element within the chamber for pivotal displacement about a pivot axis intermediate the locations at which the piston elements engage the balance element.

9. The system as defined in claim 8 wherein said cam follower means comprises a pair of plungers (56) engageable with the cam element, said spring means comprising a pair of spring elements (59) respectively extending between said plungers and the balance element on either side of the pivot axis adjacent to said valve means (47, 47a).

10. The system as defined in claim 7 wherein said cam follower means comprises a plunger (102) extending between the cam element and the balance element on one side of the valve means (84, 84a) opposite the pistons elements (91, 92).

* * * * *